(12) United States Patent
Disser

(10) Patent No.: US 6,371,256 B2
(45) Date of Patent: Apr. 16, 2002

(54) ELECTRIC DISC BRAKE CALIPER CONTROLS

(75) Inventor: Robert John Disser, Dayton, OH (US)

(73) Assignee: Delphi Technologies, INC, Troy, MI (US)

(*) Notice: Subject to any disclaimer, the term of this patent is extended or adjusted under 35 U.S.C. 154(b) by 0 days.

(21) Appl. No.: 09/735,419

(22) Filed: Dec. 12, 2000

Related U.S. Application Data

(60) Provisional application No. 60/170,558, filed on Dec. 14, 1999.

(51) Int. Cl.$^7$ .............................. B60T 8/00; B60T 13/66
(52) U.S. Cl. ..................... 188/72.1; 188/158; 188/162; 188/181 T; 303/20; 303/112; 303/3
(58) Field of Search ........................... 188/72.1, 181 T, 188/72.8, 156–165, 1.11 ALL; 303/20, 3, 155, 112, 115.2, 199, 162; 318/362, 432, 430, 433, 14; 310/83; 701/70

(56) References Cited

U.S. PATENT DOCUMENTS 5,339,641 A   8/1994   Mathis et al.
5,496,102 A   3/1996   Dimatteo et al. ........... 303/162

FOREIGN PATENT DOCUMENTS

WO   0144032   *   6/2001

* cited by examiner

Primary Examiner—Douglas C. Butler
(74) Attorney, Agent, or Firm—Scott A. McBain

(57) ABSTRACT

A controller for controlling an actuator in response to an input signal. The controller includes a first control block and a second control block. The first control block receives the input signal, detects an operating condition of the input signal, and responsively produces an operating condition signal. The operating condition signal has a first value if the operating condition of the input signal is in a small signal mode and a second value if the operating condition of the input signal is in a saturated mode. The second control block has a small signal portion and a saturation portion. The second control block is adapted to receive the input signal and the operating condition signal and responsively deliver to the actuator a control signal.

19 Claims, 1 Drawing Sheet

ELECTRIC DISC BRAKE CALIPER CONTROLS

CROSS-REFERENCE TO RELATED APPLICATIONS

This application claims the benefit of U.S. Provisional Patent Application Ser. No. 60/170,558, filed Dec. 14, 1999.

BACKGROUND OF THE INVENTION

1. Field of the Invention

The present invention is related to electronic controls for an actuator and more particularly to an electronic control which supplies both saturated signal and small signal control for an actuator.

2. Description of Relating Art

Actuators of many types are controlled using feedback control. The control logic may be embodied in analog control circuits or digital controllers. Digital control me be accomplished using many different types of devices, such as programmable logic controllers (PLC) or microprocessor based electronic control modules.

One example of an actuator is a brake caliper of a braking system of a motor vehicle. The brake caliper is actuated by a controller. Typically, an operator instructs the controller to apply the brake through operation of a brake pedal. The force applied by the brake caliper is modulated through modulation of the brake pedal.

Actuation of the brakes may be divided into a plurality of phases, for example, initial application of the brakes or application of the brakes to bring the vehicle to a complete stop, modulation of the brakes to slow the vehicle to a desired speed, and release of the brakes. During the first and last of these phases, it is desirable to apply maximum voltage and current to the actuator (in a forward or reverse direction). During the middle phase, brake force is modulated as a function of brake pedal position.

However, previous systems controlled actuation of the brake caliper using a single control function during each of these phases.

The present invention is aimed at one or more of the problems identified above.

BRIEF SUMMARY OF THE INVENTION

In one aspect of the present invention, a controller for controlling an actuator in response to an input signal is provided. The controller includes a first control block and a second control block. The first control block receives the input signal, detects an operating condition of the input signal, and responsively produces an operating condition signal. The operating condition signal has a first value if the operating condition of the input signal is in a small signal mode and a second value if the operating condition of the input signal is in a saturated mode. The second control block has a small signal portion and a saturation portion. The second control block is adapted to receive the input signal and the operating condition signal and responsively deliver to the actuator a control signal. The small signal portion and the saturation portion are adapted to produce a small signal control signal and a saturation control signal, respectively, as a function of the input signal. The control signal is equal to the small signal control signal if the operating condition signal is equal to the first value and is equal to the saturation control signal if the operation condition signal is equal to the second value.

In another aspect of the present invention, a controller for controlling a brake caliper for a brake system of a motor vehicle in response to an input signal is provided. The controller includes a first control block and a second control block. The first control block receives the input signal, detects an operating condition of the input signal, and responsively produces an operating condition signal. The operating condition signal has a first value if the operating condition of the input signal is in a small signal mode and a second value if the operating condition of the input signal is in a saturated mode. The second control block has a small signal portion and a saturation portion. The second control block is adapted to receive the input signal and the operating condition signal and responsively deliver to the brake caliper a control signal. The small signal portion and the saturation portion are adapted to produce a small signal control signal and a saturation control signal, respectively, as a function of the input signal. The control signal is equal to the small signal control signal if the operating condition signal is equal to the first value and is equal to the saturation control signal if the operation condition signal is equal to the second value.

DETAILED DESCRIPTION OF THE INVENTION

Figure 1:
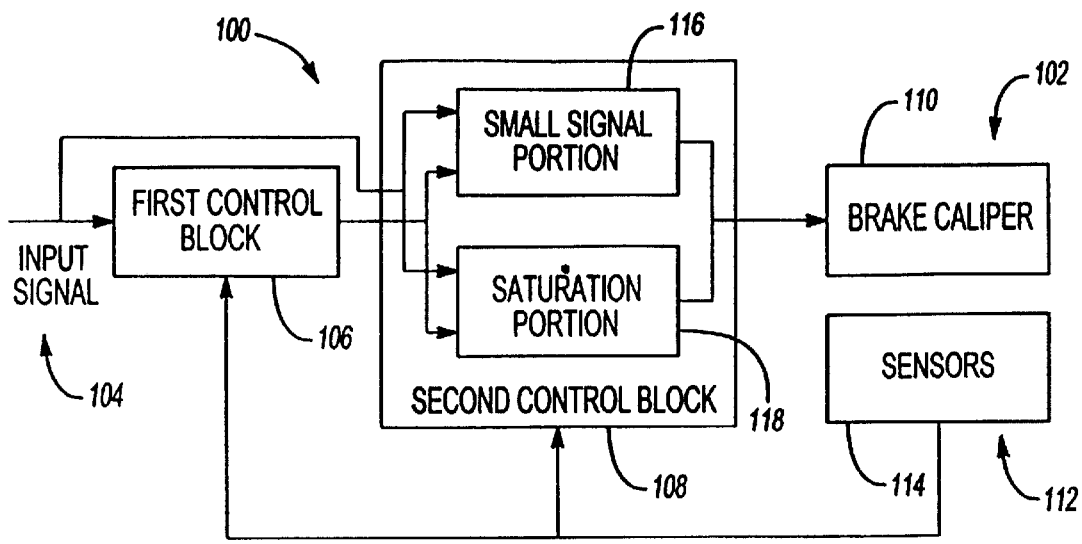
FIG. 1 is a block diagram of a controller having a first control block and a second control block, for an actuator, according to an embodiment of the present invention.

With reference to the drawings and in operation, the present invention provides a controller 100 for controlling an actuator 102 in response to an input signal 104. The controller 100 is preferably a digital controller, such as a programmable logic controller (PLC) or a microprocessor based control module. The controller 100 includes a first control block 106 and a second control block 108.

The first control block 106 receives the input signal 104 and detects an operating condition of the input signal 104. The first control block 106 responsively produces an operating condition signal as a function of the input request.

The present invention may be used to control any type of actuator 102. For example, the controller 100 may be used to control a brake caliper 110 of a brake system of a motor vehicle (not shown). The input signal 104 is an indication of the desired braking function, e.g., actuation of a brake pedal by an operator (not shown). The input signal normally has a DC and an AC component.

A sensing means 112 is coupled to the actuator 102 and provides a feedback or sensor signal to the first and second control blocks 106, 108. In one embodiment, the sensing means 112 includes a sensor 114.

The first control block 106 detects whether the input or request signal 104 signifies operation of the actuator 102 in a small signal mode or in a saturated mode. In the saturated mode, the input signal 104 is indicative of a request for maximum voltage and current to be supplied to the actuator 102. In the case of the brake caliper 110, the saturation mode is typically indicative of initial brake application and reversal of the brake motor. Small signal mode is used to regulate braking force.

As discussed below, the first control block 106 detects the applicable operating mode as a function of the input signal and generates the operating condition signal with a first value if the operating condition of the input signal is in the small signal mode and a second value if the operating condition of the input signal is in the saturated mode.

The second control block 108 includes a small signal portion 116 and a saturation portion 118. The second control block 108 is adapted to receive the input signal and the operating condition signal and responsively deliver a control signal to the actuator 102. As discussed below, the small signal portion 116 and the saturation portion 118 are adapted to produce a small signal control signal and a saturation control signal, respectively, as a function of the input signal. The control signal is equal to the small signal control signal if the operating condition signal is equal to the first value and is equal to the saturation control signal if the operation condition signal is equal to the second value. In one embodiment, the second control block 108 includes a function having a plurality of parameters, wherein the parameters are modified as a function of the operating conditioning signal. For example, the function could be a proportional, integral, derivative (PID) function, wherein the function's gains are modified as a function of the operating conditioning signal.

Figure 2:
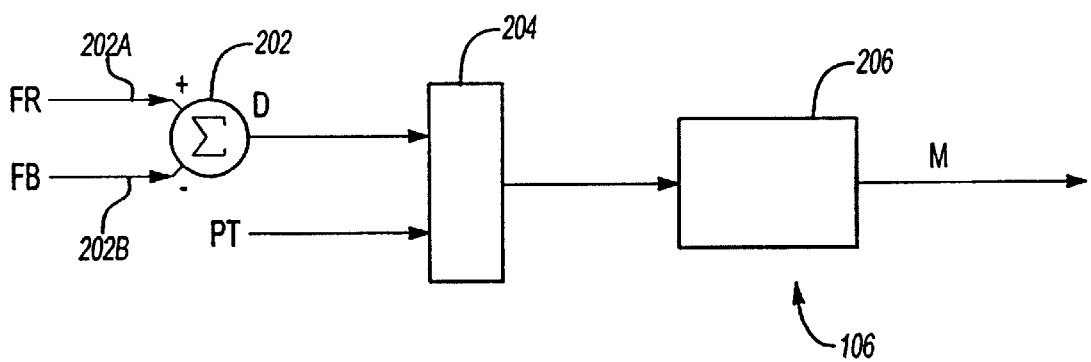
FIG. 2 is a block diagram of the first control block of FIG. 1, according to an embodiment of the present invention; and, FIG. 3 is a block diagram of the second control block of FIG. 2, according to an embodiment of the present invention.

With reference to FIG. 2, the first control block 106 includes a first summer 202 and a comparator 204. The summer 202 has a positive input 202A and a negative input 202B. The positive input 202A is coupled to the input signal 104 and the negative input 202B is coupled to the feedback signal (FB), i.e., the output of the sensing means 112. In the brake example, the input signal 104 is equal to the force request (FR). The output signal (D) of the first summer 202 is the difference between the input signal and the feedback signal. The difference signal D is compared with a predetermined threshold (PT) in the comparator 204. If the difference signal D is exceeds PT then the controller 100 is operating in the saturation mode. In the control block 108, if the difference signal D does not exceed PT then the controller 100 is operating in the small signal mode. The output (M) of the comparator is digital information, i.e., a "0" or a "1". A "1" value is indicative of the saturation mode and a "0" value is indicative of the small signal mode.

An optional filter 206 may be used to transition between the modes.

Figure 3:
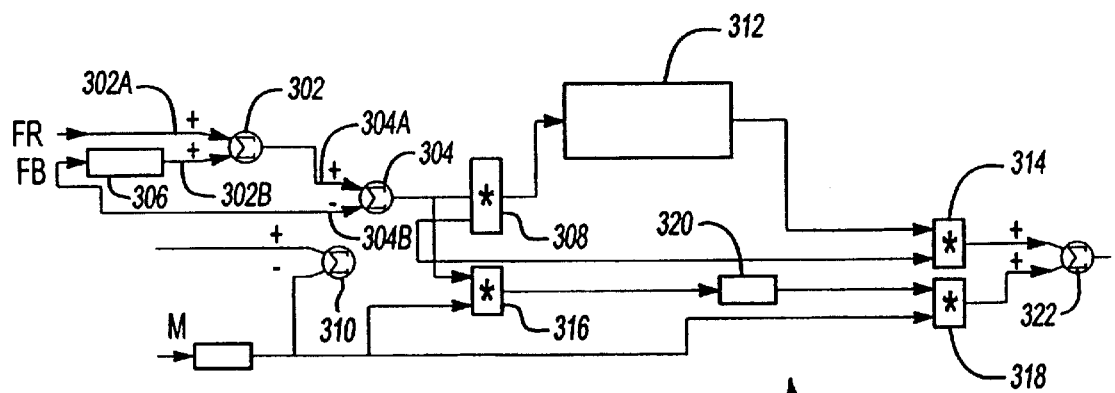

With reference to FIG. 3, the small signal portion 116 of the second control block 108 includes second and third summers 302, 304. The second summer 302 includes first and second positive inputs 302A, 302B. The first positive input 302A of the second summer 302 is coupled to the input signal 104 (FR). The second positive input 302B of the second summer 302 is coupled to the output of an optional dither block 306.

The dither block 306 adds some dither to keep the actuator 102 in a dynamic state to reduce static friction. As shown, the dither is a function of the feedback FB. The output of the second summer 302 is coupled to a positive input 304A of the third summer 304. A negative input 304B of the third summer 304 is coupled to the feedback signal FB, i.e., the output of the sensing means 112.

The output of the third summer 304 is coupled to an input of a first multiplier 308. A second input of the first multiplier 308 is coupled to the output of a fourth summer 310. A positive input of the fourth summer 310 is coupled to a value of at least 1. A negative input of the fourth summer 310 is coupled to the output (M) of the first control block 106. The output of the first multiplier 308 is coupled to a small signal function 312.

The small signal function 312 preferably includes a filter function, e.g., a La Place equation or a proportional, integral, derivative (PID) function.

The output of the small signal function 312 is coupled to an input of a second multiplier 314. A second input of the second multiplier 314 is coupled to the output of the fourth summer 310.

The saturation portion 118 includes third and fourth multipliers 316, 318. The output of the third summer 304 is coupled to an input of the third multiplier 316. A second input of the third multiplier 316 is coupled to the output (M) of the first control block 106. The output of the third multiplier 316 is coupled to a saturation signal function 320. Preferably, the saturation signal function 320 includes a PID function or a La Place equation. The output of saturation signal portion control 320 is coupled to an input of the fourth multiplier 318. A second input of the fourth multiplier 316 is coupled to the output (M) of the first control block 106.

The output of the second and fourth multipliers 314, 318 are coupled to inputs of a fifth summer 322. The output of the fourth summer 322 is the control signal delivered to the actuator 102. The first, second, third, and fourth multipliers 308, 314, 316, 318 determine which control function, i.e., the small signal function 312 or the saturation function 320 is actually controlling the actuator 102.

As determined by the first control block 106, if the controller 100 is in the small signal mode, the value of the output (M) of the first control block 106 is zero (0). Thus, the output of the saturation portion 118 of the second control block 108 is also zero (0) as a result of the second and fourth multipliers 316, 318. The output of the second control block 108, which is the control signal sent to the actuator, is thus the output of the small signal function 312.

If the controller 100 is in the saturation mode, the value of the output (M) of the first control block 106 is one (1). Thus, the output of the fourth summer 310 is substantially zero, as is the output of the small signal portion 312 of the second control block 108. The output of the second control block 108 is thus, the output of the saturation function 320.

The actual functions within the small signal function 312 and the saturation function 320 portion are a function of the actuator 102 and application thereof.

In summary, the present invention provides a combined saturated and small signal actuator control 100. The control 100 differentiates between saturated and small signal control and uses a respective control function.

With this invention has been described in reference to the illustrated embodiment, it will be understood that various modifications and design variations will occur to those skilled in the art, and that controls incorporating such modifications may fall within the scope of this invention, which is defined by the appended claims.

What is claimed is:

1. A controller for controlling an actuator in response to an input signal, comprising:
   a first control block for receiving the input signal, detecting an operating condition of the input signal, and responsively producing an operating condition signal, wherein the operating condition signal has a first value if the operating condition of the input signal is in a small signal mode and a second value if the operating condition of the input signal is in a saturated mode;
   a second control block having a small signal portion and a saturation portion, the second control block adapted to receive the input signal and the operating condition signal and responsively deliver to the actuator a control signal, the small signal portion and the saturation portion adapted to produce a small signal control signal and a saturation control signal, respectively, as a function of the input signal, wherein the control signal is equal to the small signal control signal if the operating condition signal is equal to the first value and is equal to the saturation control signal if the operation condition signal is equal to the second value.

2. A controller, as set forth in claim 1, wherein the actuator is a brake caliper.

3. A controller, as set forth in claim 1, including a sensing means for sensing a parameter of the actuator and responsively generating a sensor signal.

4. A controller, as set forth in claim 3, wherein the first control block includes a first summer coupled to the sensing means and being adapted to receive the input signal and the sensor signal, wherein an output of the first summer is a difference between the input signal and the sensor signal.

5. A controller, as set forth in claim 4, wherein the first control block further includes a comparator coupled to the first summer and being adapted to compare the output of the first summer and a predetermined threshold and responsively generating an output signal.

6. A controller, as set forth in claim 5, including a filter coupled to an output of the comparator.

7. A controller, as set forth in claim 5, wherein the small signal portion includes a dither function and a second summer, the second summer being coupled to the dither function and being adapted to receive the input signal.

8. A controller, as set forth in claim 7, wherein an output of the dither function is a function of the sensor signal.

9. A controller, as set forth in claim 7, wherein the small signal portion includes a third summer coupled to the second summer, the third summer being adapted to receive the sensor signal.

10. A controller, as set forth in claim 9, wherein the small signal portion includes a first multiplier coupled to the third summer.

11. A controller, as set forth in claim 10, wherein the small signal portion includes a small signal function coupled to the third multiplier.

12. A controller, as set forth in claim 11, wherein the small signal portion includes a fourth summer coupled to the first control block.

13. A controller, as set forth in claim 12, wherein the small signal portion includes a second multiplier coupled to the small signal function and the fourth summer.

14. A controller, as set forth in claim 13, wherein the saturation portion includes a third multiplier coupled to the first control block and the third summer.

15. A controller, as set forth in claim 14, wherein the saturation portion includes a saturation function coupled to the third multiplier.

16. A controller, as set forth in claim 15, wherein the saturation portion includes a fourth multiplier coupled to the saturation portion.

17. A controller, as set forth in claim 16, includes a fifth summer coupled to the second and third multipliers.

18. A controller, as set forth in claim 1, wherein the second control block includes a function having a plurality of parameters, wherein the parameters are modified as a function of the operating conditioning signal.

19. A controller for controlling a brake caliper for a brake system of a motor vehicle in response to an input signal, comprising:

a first control block for receiving the input signal, detecting an operating condition of the input signal, and responsively producing an operating condition signal, wherein the operating condition signal has a first value if the operating condition of the input signal is in a small signal mode and a second value if the operating condition of the input signal is in a saturated mode;

a second control block having a small signal portion and a saturation portion, the second control block adapted to receive the input signal and the operating condition signal and responsively deliver to the brake caliper a control signal, the small signal portion and the saturation portion adapted to produce a small signal control signal and a saturation control signal, respectively, as a function of the input signal, wherein the control signal is equal to the small signal control signal if the operating condition signal is equal to the first value and is equal to the saturation control signal if the operation condition signal is equal to the second value.

* * * * *